US012142470B2

(12) United States Patent
Egawa et al.

(10) Patent No.: US 12,142,470 B2
(45) Date of Patent: Nov. 12, 2024

(54) ELECTRON TUBE

(71) Applicant: HAMAMATSU PHOTONICS K.K., Hamamatsu (JP)

(72) Inventors: Yasuyuki Egawa, Hamamatsu (JP); Atsuhito Fukasawa, Hamamatsu (JP); Suenori Kimura, Hamamatsu (JP); Takayasu Nagasawa, Hamamatsu (JP); Shunsuke Kobayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 92 days.

(21) Appl. No.: 18/109,388

(22) Filed: Feb. 14, 2023

(65) Prior Publication Data

US 2024/0274421 A1 Aug. 15, 2024

(51) Int. Cl.
*H01J 43/28* (2006.01)
*H01J 43/08* (2006.01)

(52) U.S. Cl.
CPC .............. *H01J 43/28* (2013.01); *H01J 43/08* (2013.01)

(58) Field of Classification Search
None
See application file for complete search history.

(56) References Cited

U.S. PATENT DOCUMENTS 5,374,826 A 12/1994 LaRue et al.
5,874,728 A 2/1999 Suyama et al.
5,917,282 A 6/1999 Suyama et al.
6,297,489 B1 10/2001 Suyama et al.
6,765,352 B2 7/2004 Ohtomo et al.

FOREIGN PATENT DOCUMENTS

JP H7-182997 A 7/1995
JP H8-148113 A 6/1996
JP H9-213206 A 8/1997
JP 2005-339844 A 12/2005
JP 2007-026785 A 2/2007
JP 4410027 B2 2/2010
JP 2019-021410 A 2/2019
JP 2019-067495 A 4/2019
JP 6827427 * 1/2021
JP 2022-061252 A 4/2022
WO WO-2019/012914 A1 1/2019

* cited by examiner

*Primary Examiner* — Ashok Patel
(74) *Attorney, Agent, or Firm* — Faegre Drinker Biddle Reath LLP

(57) ABSTRACT

An electron tube includes a photoelectric conversion unit, an electron detection unit configured to receive a photoelectrons from the photoelectric conversion unit, a gate electrode disposed between the photoelectric conversion unit and the electron detection unit, and a housing configured to accommodate the photoelectric conversion unit, the electron detection unit, and the gate electrode. The housing has a lid portion to which the photoelectric conversion unit is fixed and which constitutes one end side of the housing. The gate electrode includes a main body portion that control passage of the photoelectrons by applying a voltage, and a power supply part that supports the main body portion so as to be spaced apart from the photoelectric conversion unit and applies a voltage to the main body portion. The power supply part is held by the lid portion.

12 Claims, 7 Drawing Sheets

ELECTRON TUBE

TECHNICAL FIELD

The present disclosure relates to an electron tube.

BACKGROUND

An electron tube which includes a photoelectric conversion unit that emits photoelectrons corresponding to incident light, an electron detection unit that receives the photoelectrons from the photoelectric conversion unit, and a housing that accommodates the photoelectric conversion unit and the electron detection unit is known (refer to, for example, U.S. Pat. No. 5,374,826).

SUMMARY

In the above-described electron tube, a gate electrode that controls passage of the photoelectrons by applying a voltage may be disposed between the photoelectric conversion unit and the electron detection unit inside the housing. In such an electron tube, it is not easy to speed up switching of the voltage applied to the gate electrode due to an influence of electrostatic capacitance between the photoelectric conversion unit and the gate electrode, and it is difficult to speed up an operation of the gate electrode.

An object of the present disclosure is to provide an electron tube capable of speeding up the operation of the gate electrode.

(1) An electron tube according to one aspect of the present disclosure includes a photoelectric conversion unit configured to emit photoelectrons corresponding to incident light, an electron detection unit configured to receive the photoelectrons from the photoelectric conversion unit, a gate electrode disposed between the photoelectric conversion unit and the electron detection unit, and a housing configured to accommodate the photoelectric conversion unit, the electron detection unit, and the gate electrode, wherein the housing has a lid portion to which the photoelectric conversion unit is fixed and which constitutes one end side of the housing, the gate electrode includes a main body portion that controls passage of the photoelectrons by applying a voltage, and a power supply part that supports the main body portion so as to be spaced apart from the photoelectric conversion unit and applies a voltage to the main body portion, and the power supply part is held by the lid portion.

In the electron tube, the power supply part of the gate electrode is held by the lid portion, so that it is not necessary to arrange and hold the power supply part so as to extend parallel to the photoelectric conversion unit, for example. Therefore, it is possible to reduce an electrostatic capacitance between the photoelectric conversion unit and the gate electrode. As a result, it is possible to speed up switching of the voltage applied to the gate electrode and to realize a high speed operation of the gate electrode.

(2) The electron tube described in (1) may further include a focusing electrode provided between the photoelectric conversion unit and the electron detection unit so as to face the photoelectric conversion unit and configured to focus the photoelectrons from the photoelectric conversion unit, and the gate electrode may be electrically connected to the focusing electrode. In this case, it is possible to reliably perform a gate operation and a focus control for photoelectrons.

(3) In the electron tube described in (2), the gate electrode may be provided integrally with the focusing electrode. In this case, the gate electrode and the focusing electrode can be disposed efficiently.

(4) In the electron tube described in any one of (1) to (3), the power supply part may include a plurality of rods each fixed to the lid portion and having one end portion located in the housing, and a connection portion that connects one end portion of each of the plurality of rods to the main body portion. In this case, it is possible to efficiently reduce the electrostatic capacitance between the photoelectric conversion unit and the gate electrode by supporting the main body portion of the gate electrode inside the housing so as to be suspended from the lid portion by the plurality of rods.

(5) In the electron tube described in (4), the plurality of rods may include a first rod that passes through the lid portion and a second rod having the other end portion embedded in the lid portion. In this case, since the second rod can be made shorter than the first rod by embedding the other end portion of the second rod in the lid portion, it is possible to further efficiently reduce the electrostatic capacitance between the photoelectric conversion unit and the gate electrode.

(6) The electron tube described in any one of (1) to (5) may further include a first electric field concentration relaxation electrode electrically connected to the lid portion so as to have the same potential as that of the photoelectric conversion unit, and configured to relax concentration of an electric field formed inside the housing, and a part of the first electric field concentration relaxation electrode may be located closer to the electron detection unit than the main body portion in a facing direction in which the photoelectric conversion unit and the electron detection unit face each other. In this case, the first electric field concentration relaxation electrode relaxes the concentration of the electric field inside the housing, and a withstand voltage of the electron tube can be increased.

(7) The electron tube described in (4) or (5) may further include a second electric field concentration relaxation electrode electrically connected to the lid portion so as to have the same potential as that of the photoelectric conversion unit and configured to relax concentration of an electric field formed inside the housing, and an end portion of the second electric field concentration relaxation electrode on an inner side of the housing may be located closer to the electron detection unit than the main body portion in a facing direction in which the photoelectric conversion unit and the electron detection unit face each other, and may extend to a position close to the power supply part in an intersecting direction that intersects the facing direction. In this case, the second electric field concentration relaxation electrode relaxes the concentration of the electric field inside the housing, and the withstand voltage of the electron tube can be increased.

(8) In the electron tube described in (7), the rod may be fixed to the lid portion by a hermetic seal portion, and the end portion of the second electric field concentration relaxation electrode on the inner side of the housing may extend until it reaches the hermetic seal portion in the intersecting direction. In this case, the second electric field concentration relaxation electrode further relaxes the concentration of the electric field inside the housing, and the withstand voltage of the electron tube can be further increased.

(9) The electron tube described in (4) or (5) may further include a third electric field concentration relaxation electrode electrically connected to the lid portion so as to have the same potential as that of the photoelectric conversion unit and configured to relax concentration of an electric field formed inside the housing, and an end portion of the third electric field concentration relaxation electrode on an inner side of the housing may be located closer to the electron detection unit than a connection point between the rod and the connection portion in the facing direction in which the photoelectric conversion unit and the electron detection unit face each other. In this case, the third electric field concentration relaxation electrode relaxes the concentration of the electric field inside the housing, and the withstand voltage of the electron tube can be increased.

(10) In the electron tube described in (9), one end portion of the third electric field concentration relaxation electrode may extend until it reaches the connection portion in an intersecting direction that intersects the facing direction. In this case, the third electric field concentration relaxation electrode further relaxes the concentration of the electric field inside the housing, and the withstand voltage of the electron tube can be further increased.

(11) The electron tube described in (4) or (5) may further include a fourth electric field concentration relaxation electrode configured to extend along an intersecting direction that intersects the facing direction in which the photoelectric conversion unit and the electron detection unit face each other, having one end portion located inside the housing and the other end portion located outside the housing, and configured to relax concentration of an electric field formed inside the housing, and one end portion of the fourth electric field concentration relaxation electrode is located closer to the electron detection unit than a connection point between the rod and the connection portion in the facing direction, and extends to a position close to the power supply part in the intersecting direction. In this case, the fourth electric field concentration relaxation electrode relaxes the concentration of the electric field inside the housing, and the withstand voltage of the electron tube can be increased.

(12) In the electron tube described in (11), one end portion of the fourth electric field concentration relaxation electrode may extend until it reaches the connection portion in the intersecting direction. In this case, the fourth electric field concentration relaxation electrode further relaxes the concentration of the electric field inside the housing, and the withstand voltage of the electron tube can be further increased.

DETAILED DESCRIPTION

Figure 1:
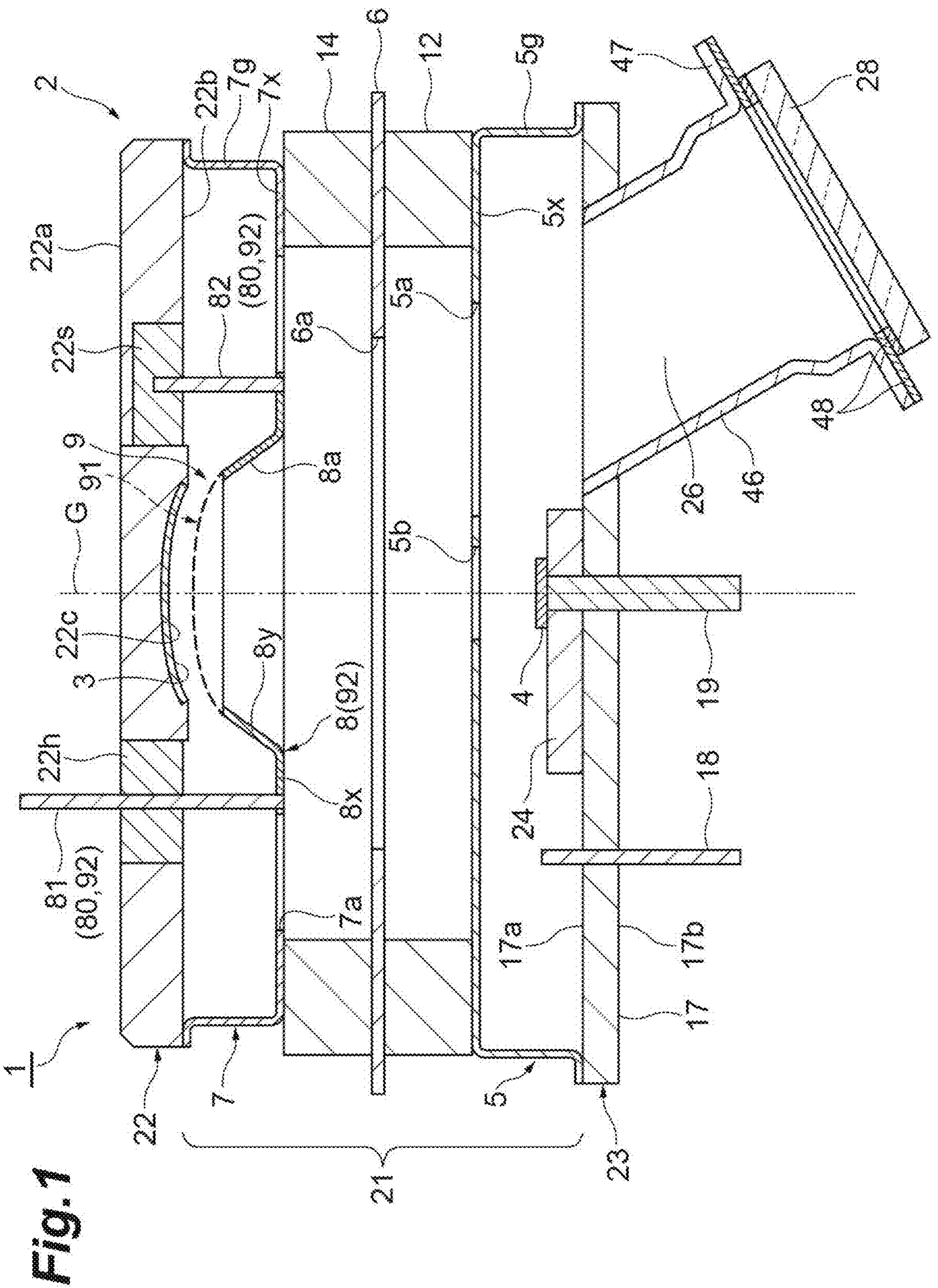
FIG. 1 is a cross-sectional view of an electron tube according to a first embodiment.

Hereinafter, embodiments of the present disclosure will be described in detail with reference to the drawings. In the following description, the same reference numerals are used for the same or corresponding elements, and overlapping descriptions will be omitted. The dimensions in the following description do not necessarily correspond to the drawings.

First Embodiment

As shown in FIG. 1, an electron tube 1 is a so-called hybrid photo-detector (HPD). The electron tube 1 is used, for example, in an electron microscope. The electron tube 1 includes a housing 2, a photocathode 3 and an electron detection unit 4.

The housing 2 forms an internal space of which the inside is maintained in a vacuum. The housing 2 has a substantially cylindrical shape. As an example, the housing 2 has an outer diameter of about 30 mm and a height of about 25 mm. The housing 2 accommodates at least the photocathode 3 and the electron detection unit 4 therein. The housing 2 includes a tubular side portion 21 having an axis G as a central axis, a lid portion 22 that constitutes one end side (one end portion) of the housing 2, and a stem 23 that forms the other end side (the other end portion) of the housing 2.

One end side of the side portion 21 is airtightly connected and sealed with the lid portion 22. The other end side of the side portion 21 is airtightly connected and sealed with the stem 23. The lid portion 22 is a disk-shaped member made of a conductive member having a light-shielding property (for example, a metal material such as Kovar). The lid portion 22 has a lid upper surface 22*a* and a lid lower surface 22*b*. The lid upper surface 22*a* is exposed outside the housing 2. The lid lower surface 22*b* is a surface on the side opposite to the lid upper surface 22*a* and is exposed inside the housing 2. An axis of the lid portion 22 overlaps the axis G of the housing 2. The lid lower surface 22*b* of the lid portion 22 faces the stem 23.

The stem 23 has a base 17, a power supply pin 18, a signal pin 19, a tubular portion 46 and a window portion 28. The disk-shaped base 17 has a base main surface 17*a* and a base back surface 17*b*. The base main surface 17*a* is exposed inside the housing 2. The base back surface 17*b* is a surface opposite to the base main surface 17*a* and is exposed outside the housing 2. The electron detection unit 4 is mounted via a substrate 24 on a central portion of the base main surface 17*a*. Examples of a material of the base 17 include copper which is a metal material with high heat dissipation, but other metal materials such as Kovar, conductive materials, and insulating materials such as ceramics can also be used. The base 17 effectively dissipates heat generated during the operation of the electron detection unit 4.

The power supply pin 18 applies a voltage to the substrate 24 on which the electron detection unit 4 is mounted. The power supply pin 18 is a rod-shaped conductive member that extends parallel to the axis G. One end of the power supply pin 18 is exposed inside the housing 2. The other end of the power supply pin 18 is exposed outside the housing 2. One end of the power supply pin 18 is electrically connected to the substrate 24 via a wire (not shown). The power supply pin 18 is insulated from the stem 23.

The signal pin 19 picks up a signal from the electron detection unit 4. The signal pin 19 is a rod-shaped conductive member that extends parallel to the axis G. One end of the signal pin 19 is electrically connected to the electron detection unit 4 via the substrate 24. The other end of the signal pin 19 is exposed outside the housing 2. The signal pin 19 is insulated from the stem 23.

The tubular portion 46 is a cylindrical member that constitutes a light incidence hole 26 for receiving light inside the housing 2. The tubular portion 46 protrudes from the base 17 toward the outside of the housing 2 in a direction that is inclined with respect to the axis G. The window portion 28 is airtightly joined to a flange 47 on the tip end side of the tubular portion 46 via an aluminum ring 48. The window portion 28 allows light from the outside to pass through the housing 2. The window portion 28 is made of a glass material (for example, quartz or sapphire glass) that is transparent to light. The window portion 28 made of quartz can effectively transmit light having a short wavelength such as ultraviolet light. The material of the window portion 28 may be selected according to the wavelength of light to be detected.

The photocathode 3 emits photoelectrons corresponding to incident light. The photocathode 3 is a film-like portion disposed on the lid portion 22. The photocathode 3 is formed on a recessed curved surface 22*c* that is recessed in the lid lower surface 22*b* of the lid portion 22. The curved surface 22*c* is a curved surface formed on the inner space side of the housing 2 in the lid portion 22. The curved surface 22*c* is a paraboloid of revolution with the axis G as an axis of rotation. The photocathode 3 is an alkali photocathode made of, for example, Sb-K-Cs. A crystalline photocathode material such as GaAsP can also be used as the photocathode material. Electric potential supply to the photocathode 3 is performed via the lid portion 22. In the present embodiment, as described above, since the lid portion 22 is made of a conductive material having the light shielding property, the photocathode 3 functions as a reflective photocathode, and incidence of noise light to the photocathode 3 from the lid portion 22 side is suppressed.

The electron detection unit 4 is an electron detection unit that receives photoelectrons from the photocathode 3. An example of the electron detection unit 4 is a semiconductor element, and particularly preferably one having an electron multiplying function. Such semiconductor elements include, for example, avalanche photodiodes. An avalanche photodiode is a semiconductor element in which heavily doped P and N regions are joined to form an electric field high enough for avalanche amplification there. The electron detection unit 4 is disposed on the base main surface 17*a* of the stem 23 with the substrate 24 interposed therebetween. The electron detection unit 4 is disposed on the axis G. When photoelectrons are incident on an incident surface of the electron detection unit 4, the photoelectrons are multiplied and an electric signal is output. Therefore, the electron detection unit 4 can also be said to be an electron multiplier.

In the present embodiment, the side portion 21 of the housing 2 has a first focusing electrode 5, an insulating tubular portion 12, an intermediate electrode part 6, an insulating tubular portion 14 and an electric field concentration relaxation electrode 7. The first focusing electrode 5, the insulating tubular portion 12, the intermediate electrode part 6, the insulating tubular portion 14, and the electric field concentration relaxation electrode 7 are disposed so as to be stacked in this order from the stem 23 side to the lid portion 22 side. The first focusing electrode 5 is an electrode part disposed between the photocathode 3 and the electron detection unit 4. The first focusing electrode 5 is an electrode part closest to the electron detection unit 4. The first focusing electrode 5 is disposed so as to directly face the electron detection unit 4. The first focusing electrode 5 focuses photoelectrons on the electron detection unit 4. The first focusing electrode 5 is a conductive member having a substantially cap shape. The first focusing electrode 5 has a flat plate portion 5*x* having a circular flat plate shape of which a thickness direction is a direction of the axis G, and a peripheral wall portion 5*g* that stands upright on an outer peripheral edge of the flat plate portion 5*x*. The first focusing electrode 5 is airtightly connected to the insulating tubular portion 12 and the stem 23 between the insulating tubular portion 12 and the stem 23. The first focusing electrode 5 is provided at the same potential as that of the stem 23. The first focusing electrode 5 is supplied with a voltage of 6 kV, for example, from an electrically connected power supply (not shown).

A light passage hole 5*a* and a passage hole 5*b* are formed in the flat plate portion 5*x* of the first focusing electrode 5. The light passage hole 5*a* is a through hole that guides the light that has passed through the window portion 28 and the light incidence hole 26 to the photocathode 3. The passage hole 5*b* is a through hole through which at least photoelectrons from the photocathode 3 pass. The passage hole 5*b* is provided in a central portion of the flat plate portion 5*x* of the first focusing electrode 5. The passage hole 5*b* is formed adjacent to but separated from the light passage hole 5*a* in the flat plate portion 5*x*.

The insulating tubular portions 12 and 14 are insulating members having a cylindrical shape with the axis G as a central axis. The insulating tubular portions 12 and 14 are made of, for example, a ceramic material. The insulating tubular portion 12 is airtightly connected to the first focusing electrode 5 and the intermediate electrode part 6 between the first focusing electrode 5 and the intermediate electrode part 6. The insulating tubular portion 14 is airtightly connected to the intermediate electrode part 6 and the electric field concentration relaxation electrode 7 between the intermediate electrode part 6 and the electric field concentration relaxation electrode 7.

The intermediate electrode part 6 is an electrode part disposed between the photocathode 3 and the first focusing electrode 5. The intermediate electrode part 6 is a plate-like conductive member having an annular shape with the axis G as a central axis thereof and having a thickness direction along the direction of the axis G. The intermediate electrode part 6 has a function of stabilizing an electric field formed inside the housing 2. The intermediate electrode part 6 is airtightly connected to the insulating tubular portions 12 and 14 between the insulating tubular portions 12 and 14. The intermediate electrode part 6 is supplied with a voltage of 3 kV, for example, from an electrically connected power supply (not shown). The intermediate electrode part 6 has a passage hole 6*a* provided in a central portion thereof. The passage hole 6*a* is a through hole through which at least light to the photocathode 3 and photoelectrons from the photocathode 3 pass. An inner diameter of the passage hole 6*a* is larger than the inner diameter of the passage hole 5*b*.

The electric field concentration relaxation electrode 7 is electrically connected to the lid portion 22 so as to have the same potential as that of the photocathode 3. In the present embodiment, the electric field concentration relaxation electrode 7 is an electrode part that directly contacts the lid portion 22. The electric field concentration relaxation electrode 7 relaxes concentration of the electric field formed inside the housing 2. The electric field concentration relaxation electrode 7 has a passage hole 7*a* provided in a central portion thereof. An inner diameter of the passage hole 7*a* is larger than the inner diameter of the passage hole 6*a*. Details of the electric field concentration relaxation electrode 7 will be described below.

Figure 2:
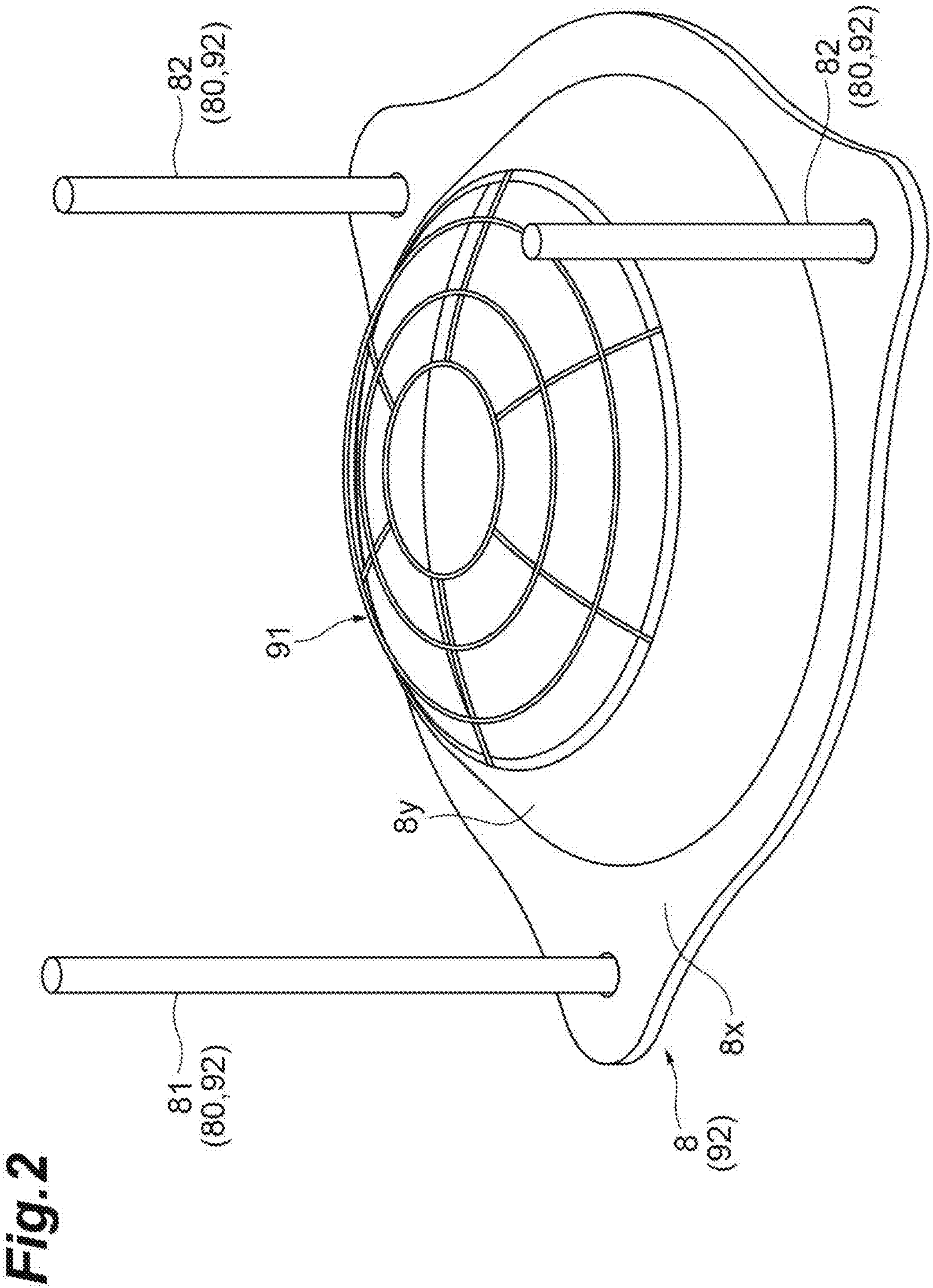
FIG. 2 is a perspective view showing a gate electrode of FIG. 1.
Figure 3:
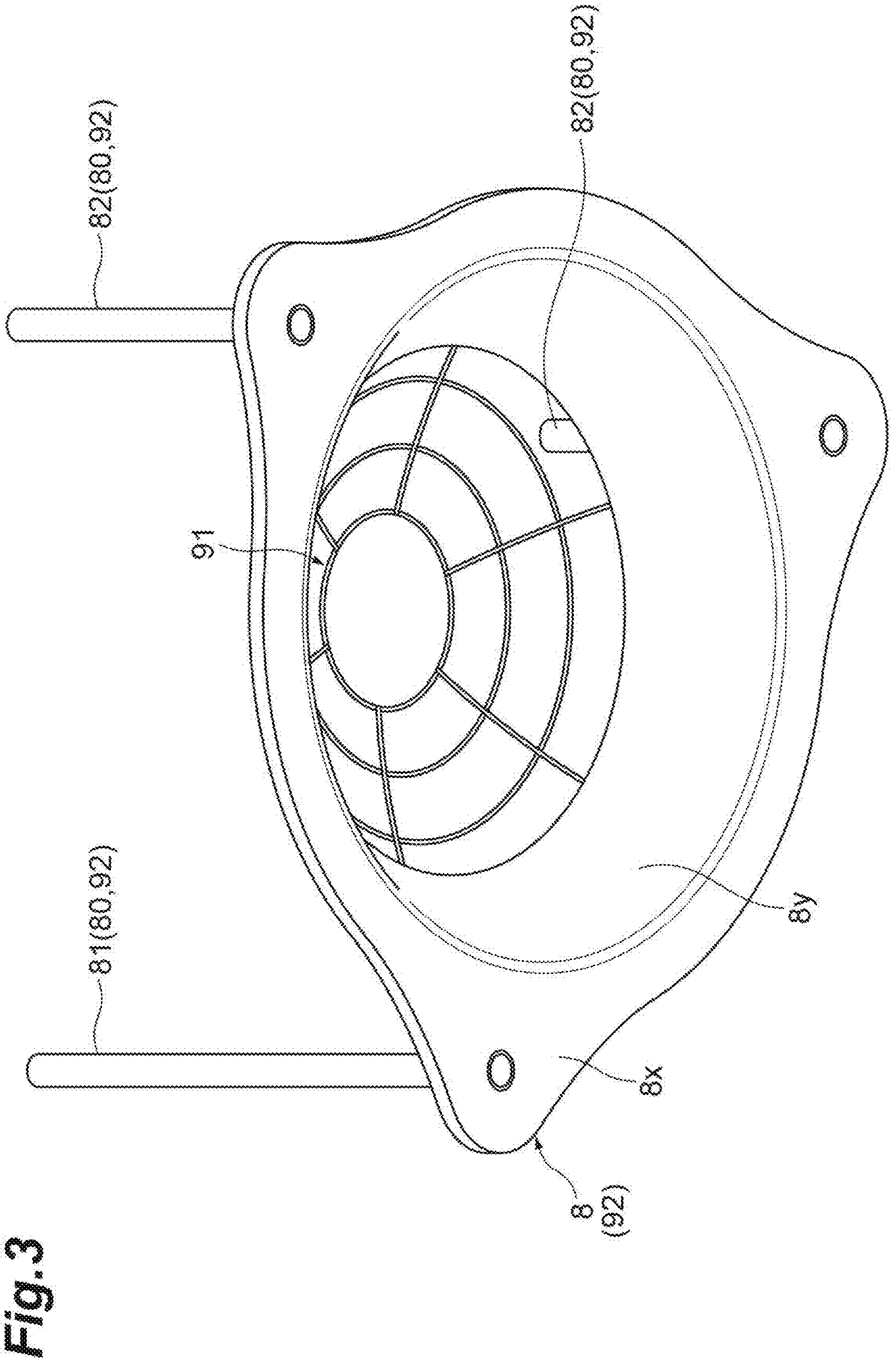
FIG. 3 is another perspective view showing the gate electrode of FIG. 1.

As shown in FIGS. 1, 2 and 3, the electron tube 1 of the present embodiment includes a second focusing electrode 8. The second focusing electrode 8 is accommodated inside the housing 2. The second focusing electrode 8 is an electrode part disposed between the photocathode 3 and the intermediate electrode part 6. The second focusing electrode 8 is a substantially annular plate-shaped conductive member with the axis G as a central axis thereof. The second focusing electrode 8 is provided so as to face the photocathode 3 and focuses photoelectrons from the photocathode 3.

The second focusing electrode 8 includes a flat plate-like annular plate portion 8*x* having the axis G as a central axis thereof and having a thickness direction along the direction of the axis G, and a tapered portion 8*y* that is continuous with an inner peripheral edge of the annular plate portion 8*x*. The annular plate portion 8*x* has a substantially polygonal (substantially triangular in the present embodiment) external shape when seen in the direction along the axis G. Polygonal corner portions of the annular plate portion 8*x* have a rounded R shape. Thus, disturbance of the electric field due to the corner portions can be suppressed, and electric discharge can be suppressed. The tapered portion 8*y* is inclined so as to be bent to the curved surface 22*c* side of the lid portion 22 (the photocathode 3 side), and protrudes from the inner peripheral edge of the annular plate portion 8*x* in a direction of decreasing a diameter toward the axis G. The tapered portion 8*y* has an outer surface of a truncated cone having the axis G as a central axis thereof of which a diameter decreases toward the curved surface 22*c* side of the lid portion 22 (the photocathode 3 side). The second focusing electrode 8 has a passage hole 8*a* provided in a central portion thereof. The passage hole 8*a* is a through hole through which at least light to the photocathode 3 and photoelectrons from the photocathode 3 pass. An inner diameter of the passage hole 8*a* is formed so as to decrease toward the curved surface 22*c* (the photocathode 3) of the lid portion 22.

One end portion of a rod 80 made of a conductive material that extends in the direction of the axis G is fixed and connected by laser welding, for example, to a plurality of positions of an edge portion of the annular plate portion 8*x* of the second focusing electrode 8, more specifically, at positions corresponding to the corner portions of a substantially polygonal shape (a substantially triangular shape). Each of a plurality of rods 80 is airtightly fixed to the lid portion 22 at the other end portion with one end portion located inside the housing 2. Thus, the second focusing electrode 8 is suspended from the lid portion 22 by the plurality of rods 80 and held at a position between the photocathode 3 and the intermediate electrode part 6 inside the housing 2. Along with this, the second focusing electrode 8 is supplied with a voltage from a power supply (not shown) through the rods 80.

The first focusing electrode 5, the intermediate electrode part 6, and the second focusing electrode 8 as described above generate an electric field of a group of equipotential lines (equipotential surfaces) forming an electron lens that focuses photoelectrons from the photocathode 3 toward the electron detection unit 4 inside the housing 2.

The electron tube 1 of the present embodiment includes a gate electrode 9. At least part of the gate electrode 9 is accommodated inside the housing 2. The gate electrode 9 includes a main body portion 91 that controls passage of the photoelectrons by applying a voltage, and a power supply part 92 that supports the main body portion 91 so as to be spaced apart from the photocathode 3 and applies a voltage to the main body portion 91. The gate electrode 9 is electrically connected to the second focusing electrode 8. In the present embodiment, the gate electrode 9 is provided integrally with the second focusing electrode 8. That is, part of the gate electrode 9 is configured of the second focusing electrode 8.

The main body portion 91 is an electrode part closest to the photocathode 3. The main body portion 91 is a conductive member having a shape that curves and extends along (follows) the photocathode 3 provided on the curved surface 22*c* that is a paraboloid of revolution with the axis G as the axis of rotation. In other words, the main body portion 91 is formed of a paraboloid of revolution with the axis G as the axis of rotation, and has a dome-like shape that protrudes toward the photocathode 3. The main body portion 91 is disposed apart from the photocathode 3 at a certain distance. The main body portion 91 and the photocathode 3 are spaced apart from each other with a substantially constant gap therebetween. Thus, a uniform gate operation can be performed over the entire surface of the photocathode 3. The main body portion 91 is made of a fine wire-shaped metal member, and has a diameter (a width) smaller than a diameter of the rod 80, for example. When seen in the direction of the axis G, the main body portion 91 has a web structure such as a spider's web having a circular opening in the center. Specifically, the main body portion 91 includes, for example, a plurality of concentric ring members having different diameters, and a plurality of radial members that intersect the plurality of ring members and extend radially. Further, the main body portion 91 is disposed so as to be smoothly continuous with the outer surface of the tapered portion 8*y* of the second focusing electrode 8 in a cross section seen in a direction along the axis G. Thus, the disturbance of the electric field during a gate operation can be suppressed, and the electric discharge can be suppressed.

The power supply part 92 is configured of the plurality of rods 80 and the second focusing electrode 8 described above, and is held by the lid portion 22. The plurality of rods 80 are conductive members each having a bar shape with a circular cross section. The plurality of rods 80 include one first rod 81 that passes through the lid portion 22 and extends to the outside, and two second rods 82 of which the other end portions are embedded in the lid portion 22.

The first rod 81 is longer than the second rod 82. The first rod 81 passes through the lid portion 22. The other end portion of the first rod 81 is located outside the housing 2. For example, a central portion of the first rod 81 is airtightly fixed to the lid portion 22 by a hermetic seal (a hermetic seal portion) 22*h* containing an insulating material such as glass. The hermetic seal 22*h* is provided in a through hole formed in lid portion 22. The second rod 82 is shorter than the first rod. The second rod 82 does not pass through the lid portion 22. The other end portion of the second rod 82 is airtightly fixed to the lid portion 22 by a hermetic seal (a hermetic seal portion) 22*s* containing an insulating material such as glass. The hermetic seal 22*s* is provided in the recess in the lid portion 22 that opens to the lid lower surface 22*b* side. The hermetic seal 22*s* is not exposed to the outside.

The second focusing electrode 8 constitutes a connection portion that connects one end portion of each of the plurality of rods 80 to the main body portion 91. The edge portion of the main body portion 91 is fixed to a top portion (an edge of the passage hole 8*a*) of the tapered portion 8*y* of the second focusing electrode 8 on the lid portion 22 side. Thus, a voltage is applied from a power supply (not shown) to the main body portion 91 via the first rod 81.

The electron tube 1 of the present embodiment includes the electric field concentration relaxation electrode 7 as described above. The electric field concentration relaxation electrode 7 is electrically connected to the lid portion 22 so as to have the same potential as that of the photocathode 3. In the present embodiment, the electric field concentration relaxation electrode 7 is an electrode part that is in direct contact with the lid portion 22. The electric field concentration relaxation electrode 7 is a conductive member including an annular plate portion 7*x* having an annular shape with the axis G as a central axis and having a thickness direction in the direction of the axis G, a peripheral wall portion 7*g* that stands upright on an outer peripheral edge of the annular plate portion 7*x*. The electric field concentration relaxation electrode 7 is airtightly connected between the insulating tubular portion 14 and the lid portion 22 of the housing 2.

The annular plate portion 7*x* which is a part of the electric field concentration relaxation electrode 7 is located closer to the electron detection unit 4 than the main body portion 91 of the gate electrode 9 in the direction of the axis G (a facing direction). Specifically, the annular plate portion 7*x* is located at substantially the same position as the annular plate portion 8*x* of the second focusing electrode 8 in the direction of the axis G. In the electric field concentration relaxation electrode 7, the second focusing electrode 8 is disposed in the passage hole 7*a* thereof. Such an electric field concentration relaxation electrode 7 shifts an equipotential line related to the potential of the photocathode 3 (the cathode potential) to the electron detection unit 4 side, and relaxes concentration of the electric field formed inside the housing 2. The electric field concentration relaxation electrode 7 constitutes a first electric field concentration relaxation electrode.

As described above, in the electron tube 1, since the power supply part 92 of the gate electrode 9 is held by the lid portion 22, it is not necessary to arrange and hold the power supply part 92 so as to expand parallel to the photocathode 3, for example. Therefore, it is possible to reduce a volume of a member constituting the power supply part 92, and to reduce an electrostatic capacitance between the photocathode 3 and the gate electrode 9. As a result, it is possible to speed up switching of the voltage applied to the gate electrode 9 and to realize a high speed operation of the gate electrode 9.

The electron tube 1 has the second focusing electrode 8 between the photocathode 3 and the electron detection unit 4, and the gate electrode 9 is electrically connected to the second focusing electrode 8. Therefore, it is possible to reliably perform a gate operation for photoelectrons (control of passage of photoelectrons) and a focus control. Furthermore, the gate electrode 9 is provided integrally with the second focusing electrode 8. In this case, the gate electrode 9 and the second focusing electrode 8 can be disposed efficiently.

In the electron tube 1, the power supply part 92 has the plurality of rods 80 and the second focusing electrode 8. In this case, when the main body portion 91 of the gate electrode 9 inside the housing 2 is supported to be suspended from the lid portion 22 by the plurality of rods 80, for example, as compared with a structure in which the power supply part 92 is disposed and held so as to expand parallel to the photocathode 3, the volume of the member constituting the power supply part 92 can be further reduced, and it is possible to efficiently reduce the electrostatic capacitance between the photocathode 3 and the gate electrode 9.

In the electron tube 1, the plurality of rods 80 includes the first rod 81 that passes through the lid portion 22 and the second rod 82 of which the other end portion is embedded in the lid portion 22. It is possible to reduce the volume of the member constituting the power supply part 92 and to efficiently reduce the electrostatic capacitance between the photocathode 3 and the gate electrode 9 by making the second rod 82 shorter than the first rod 81. Further, since the other end portion of the second rod 82 is embedded in the lid portion 22, it is possible to suppress unintentional fluctuation of the potential of the gate electrode 9 due to potential disturbance caused by an external factor or the like being transmitted to the gate electrode 9 via the second rod 82. In addition, the configuration in which the main body portion 91 of the gate electrode 9 is supported to be suspended from the lid portion 22 can be realized using the first rod 81 and the second rod 82.

In the gate electrode 9 suspended from the lid portion 22, due to the structure thereof, electric field concentration (rapid bending of equipotential line) tends to occur around the gate electrode 9, and a withstand voltage tends to be insufficient. In this regard, the electron tube 1 is provided with the electric field concentration relaxation electrode 7, and the electric field concentration relaxation electrode 7 has a shape that measures the withstand voltage, that is, a shape in which the annular plate portion 7*x* is located closer to the electron detection unit 4 than the main body portion 91 in the direction of the axis G. In such a configuration, the concentration of the electric field inside the housing 2 can be relaxed by the electric field concentration relaxation electrode 7, and the withstand voltage of the electron tube 1 can be increased.

Figure 4:
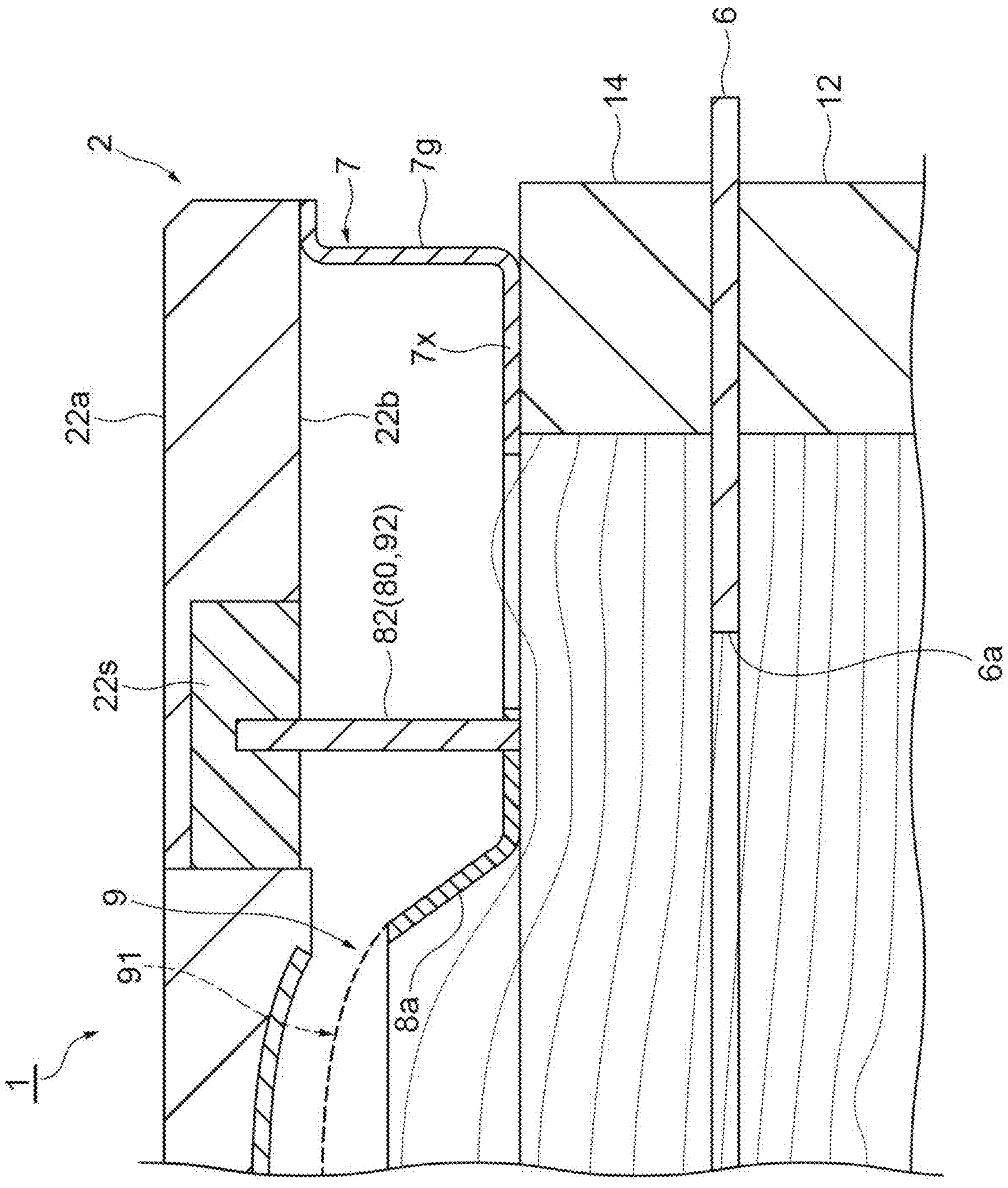
FIG. 4 is a cross-sectional view showing an enlarged part of the inside of the electron tube of FIG. 1.

FIG. 4 is a cross-sectional view showing an enlarged part of the inside of the housing 2 of FIG. 1. FIG. 4 shows a group of equipotential lines inside the housing 2 (the same applies to FIGS. 5 and 6 described below). As shown in FIG. 4, it can be understood that the electric field concentration relaxation electrode 7 shifts the equipotential line (the cathode potential) closest to the photocathode 3 to the electron detection unit 4 side, and thus the electric field concentration (rapid bending of the equipotential line) can be suppressed. It can be understood that the electric field concentration relaxation electrode 7 guides the equipotential lines so as to extend along a direction perpendicular to the axis G, and intrusion (penetration) of the equipotential lines into the photocathode 3 side can be suppressed.

The electric field concentration relaxation electrode 7 relaxes the electric field concentration inside the housing 2, making it possible to increase the withstand voltage of the electron tube 1.

Second Embodiment

Next, a second embodiment will be described. In the description of the present embodiment, points different from the first embodiment will be described.

Figure 5:
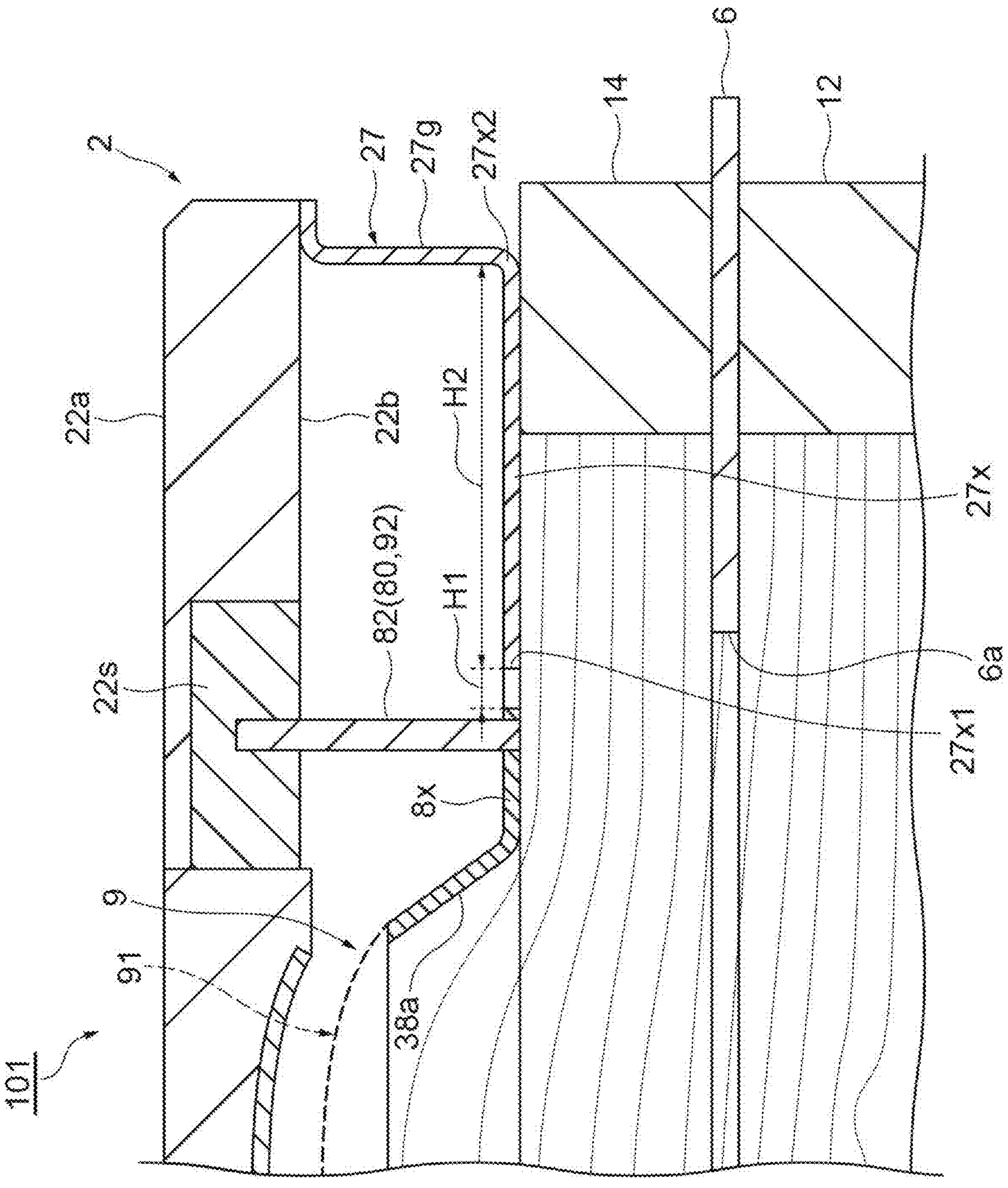
FIG. 5 is a cross-sectional view showing an enlarged part of the inside of an electron tube according to a second embodiment.

As shown in FIG. 5, an electron tube 101 according to a second embodiment is different from the first embodiment in that an electric field concentration relaxation electrode 27 is provided instead of the electric field concentration relaxation electrode 7 (refer to FIG. 1). The electric field concentration relaxation electrode 27 is electrically connected to a lid portion 22 so as to have the same potential as that of the photocathode 3. In the present embodiment, the electric field concentration relaxation electrode 27 is an electrode part that is in direct contact with the lid portion 22. The electric field concentration relaxation electrode 27 has a passage hole 27*a* provided in a central portion thereof. In the electric field concentration relaxation electrode 27, the second focusing electrode 8 is disposed in the passage hole 27*a*.

The electric field concentration relaxation electrode 27 is a conductive member including an annular plate portion 27*x* having an annular shape with the axis G as a central axis thereof and having a thickness direction along the direction of the axis G, and a peripheral wall portion 27*g* that stands upright on an outer peripheral edge of the annular plate portion 27*x*. The electric field concentration relaxation electrode 27 is airtightly connected between the insulating tubular portion 14 and the lid portion 22 of the housing 2.

An end portion 27*x*1 on the inner peripheral side of the annular plate portion 27*x* of the electric field concentration relaxation electrode 27 is located closer to the electron detection unit 4 than the main body portion 91 of the gate electrode 9 in the direction of the axis G. Specifically, the end portion 27*x*1 of the annular plate portion 27*x* on the inner peripheral side is located at substantially the same position as the annular plate portion 8*x* of the second focusing electrode 8 in the direction of the axis G. The end portion 27*x*1 on the inner peripheral side of the annular plate portion 27*x* of the electric field concentration relaxation electrode 27 extends until it reaches a position close to the power supply part 92, particularly the annular plate portion 8*x* of the second focusing electrode 8 in the present embodiment, in an orthogonal direction (an intersecting direction) perpendicular to the direction of the axis G. In other words, in the orthogonal direction (the intersecting direction) perpendicular to the direction of the axis G, a distance H1 between the end portion 27*x*1 on the inner peripheral side of the annular plate portion 27*x* of the electric field concentration relaxation electrode 27 and the outer peripheral edge of the annular plate portion 8*x* facing thereto is shorter than a distance H2 between the end portion 27*x*1 on the inner peripheral side of the annular plate portion 27*x* of the electric field concentration relaxation electrode 27 and an end portion 27*x*2 of the annular plate portion 27*x* on the outer peripheral side. In the present embodiment, the end portion 27*x*1 on the inner peripheral side of the annular plate portion 27*x* of the electric field concentration relaxation electrode 27 extends until it reaches the hermetic seal 22*s* in the orthogonal direction (the intersecting direction) perpendicular to the direction of the axis G. Specifically, the end portion 27*x*1 of the annular plate portion 27*x* on the inner peripheral side extends until it reaches the outer peripheral edge of the annular plate portion 8*x* of the second focusing electrode 8. The end portion 27*x*1 of the annular plate portion 27*x* on the inner peripheral side extends inward in the orthogonal direction with respect to the intermediate electrode part 6. The electric field concentration relaxation electrode 27 constitutes a second electric field concentration relaxation electrode.

As described above, in the electron tube 101 as well, it is possible to realize a high speed operation of the gate electrode 9. Further, the electric field concentration relaxation electrode 27 shifts the equipotential line (the cathode potential) closest to the photocathode 3 to the electron detection unit 4 side, and thus the electric field concentration (the rapid bending of the equipotential line) can be suppressed. The electric field concentration relaxation electrode 27 further guides the equipotential lines to extend in the direction perpendicular to the axis G, and thus the intrusion (penetration) of the equipotential lines into the photocathode 3 side can be further suppressed. The electric field concentration relaxation electrode 27 relaxes the electric field concentration inside the housing 2 and makes it possible to increase the withstand voltage of the electron tube 201.

Third Embodiment

Next, a third embodiment will be described. In the description of the present embodiment, points different from the second embodiment will be described.

Figure 6:
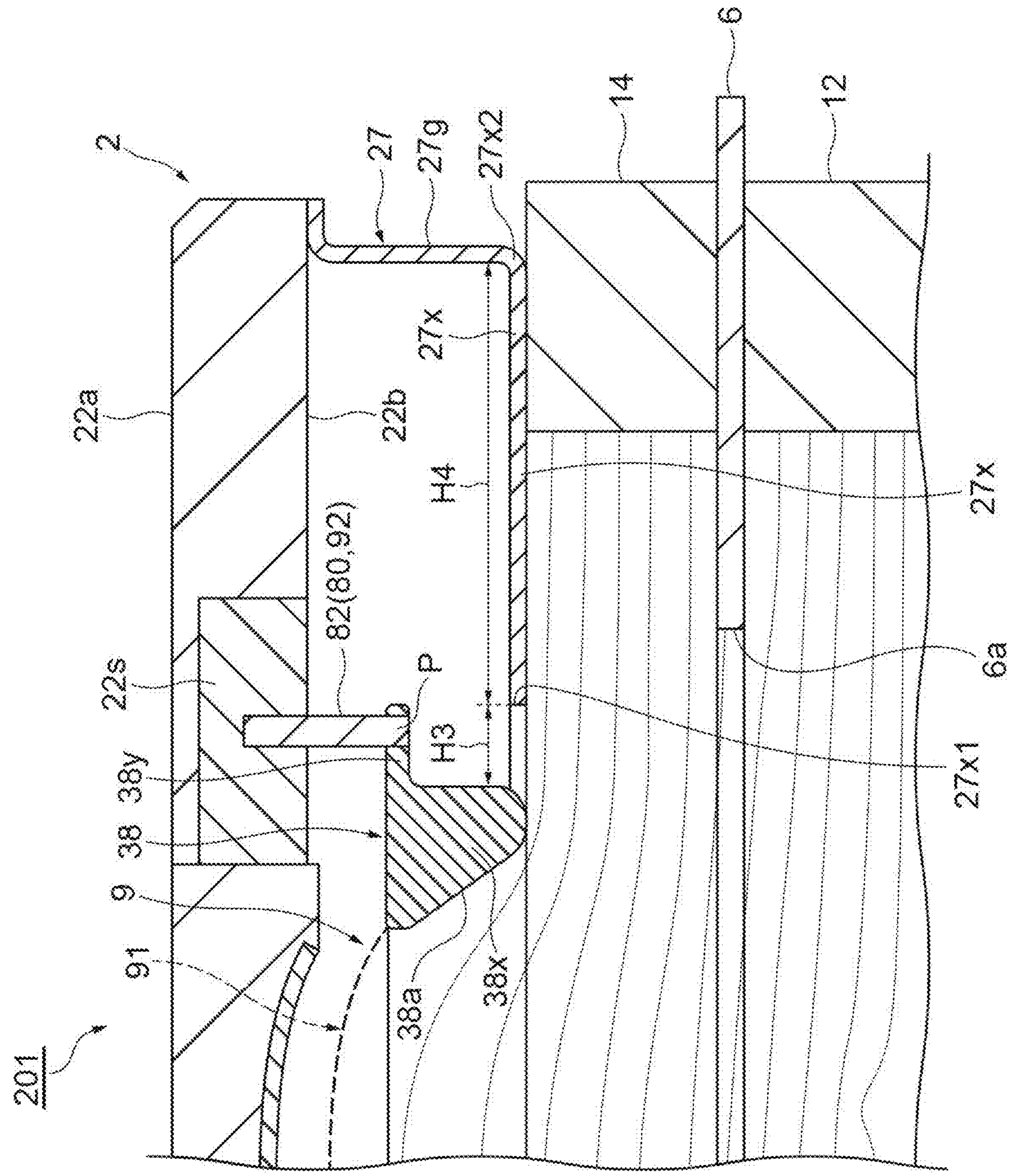
FIG. 6 is a cross-sectional view showing an enlarged part of the inside of an electron tube according to a third embodiment.

As shown in FIG. 6, an electron tube 201 according to the third embodiment is different from the second embodiment in that it includes a second focusing electrode 38 in which a connection point P with one end portion of the rod 80 is located on the side of the photocathode 3 in the direction of the axis G, instead of the second focusing electrode 8 (refer to FIG. 1).

The second focusing electrode 38 has a substantially cylindrical portion 38*x* with the axis G as a central axis thereof, and a flange portion 38*y* provided at the end portion on the photocathode 3 side of an outer peripheral surface of the cylindrical portion 38*x*. A passage hole 38*a* corresponding to an inner hole of the cylindrical portion 38*x* is inclined so that a diameter thereof increases as a distance increases from the photocathode 3 except for the end portion on the photocathode 3 side. In other words, the cylindrical portion 38*x* has a shape such that a width (a thickness) in the orthogonal direction (the intersecting direction) perpendicular to the direction of the axis G decreases as a distance from the photocathode 3 increases. In a cross section seen in a direction along the axis G, an inner wall surface of the cylindrical portion 38*x* forming the passage hole 38*a* is a tapered surface of which a diameter increases so that a distance from the axis G increases as a distance from the photocathode 3 increases. On the other hand, an outer wall surface of the cylindrical portion 38*x* is a circumferential surface that extends along the axis G. Further, a surface (an upper surface) of the cylindrical portion 38*x* on the photocathode 3 side is an annular planar portion that extends along the orthogonal direction (the intersecting direction) orthogonal to the direction of the axis G. A connection region between the upper surface and the inner wall surface of the cylindrical portion 38*x* and a connection region between the outer wall surface and the inner wall surface of the cylindrical portion 38*x* both have an R shape with rounded corner portions. Thus, the disturbance of the electric field due to the corner portions can be suppressed, and the electric discharge can be suppressed.

The flange portion 38*y* has an annular plate shape of which a thickness direction is along the direction of the axis G. The flange portion 38*y* is provided so as to protrude radially outward from the outer peripheral surface of the cylindrical portion 38*x* on the upper surface side. The upper surface of the flange portion 38*y* is flush with the upper surface of the cylindrical portion 38*x*. In addition, an end portion of the flange portion 38*y* that protrudes radially outward has an R shape with rounded corner portions. Thus, the disturbance of the electric field due to the corner portions can be suppressed, and the electric discharge can be suppressed. One end portions of the rods 80 that extend along the direction of the axis G are fixed and connected at connection points P by laser welding, for example, to a plurality of positions of the flange portion 38*y*.

An end portion 27*x*1 on the inner peripheral side of the annular plate portion 27*x* of the electric field concentration relaxation electrode 27 is located closer to the electron detection unit 4 than the connection point P between the rod 80 and the second focusing electrode 38 in the direction of the axis G. Further, the end portion 27$x$1 on the inner peripheral side of the annular plate portion 27$x$ of the electric field concentration relaxation electrode 27 extends until it reaches a position close to the power supply part 92, particularly, the cylindrical portion 38$x$ of the second focusing electrode 38 in the orthogonal direction (the intersecting direction) perpendicular to the direction of the axis G in the present embodiment. In other words, in the orthogonal direction (the intersecting direction) perpendicular to the direction of the axis G, a distance H3 between the end portion 27$x$1 on the inner peripheral side of the annular plate portion 27$x$ of the electric field concentration relaxation electrode 27 and the outer wall surface of the cylindrical portion 38$x$ facing it is shorter than a distance H4 between the end portion 27$x$1 on the inner peripheral side of the annular plate portion 27$x$ of the electric field concentration relaxation electrode 27 and the end portion 27$x$2 on the outer peripheral side of the annular plate portion 27$x$. In the present embodiment, the end portion 27$x$1 on the inner peripheral side of the annular plate portion 27$x$ of the electric field concentration relaxation electrode 27 extends until it reaches the hermetic seal 22$s$ in the orthogonal direction (the intersecting direction) perpendicular to the direction of the axis G, and extends until it reaches the flange portion 38$y$ here. The end portion 27$x$1 on the inner peripheral side of the annular plate portion 27$x$ extends inward in the orthogonal direction with respect to the intermediate electrode part 6. The electric field concentration relaxation electrode 27 constitutes a third electric field concentration relaxation electrode.

As described above, in the electron tube 201 as well, it is possible to realize a high speed operation of the gate electrode 9. Further, in the electron tube 201, the connection point P between the second focusing electrode 38 and one end portion of the rod 80 can be located on the photocathode 3 side in the direction of the axis G which is less susceptible to the influence of the electric field. In the electron tube 201, the electric field concentration relaxation electrode 27 relaxes the concentration of the electric field inside the housing 2, so that the withstand voltage of the electron tube 201 can be increased.

Figure 7:
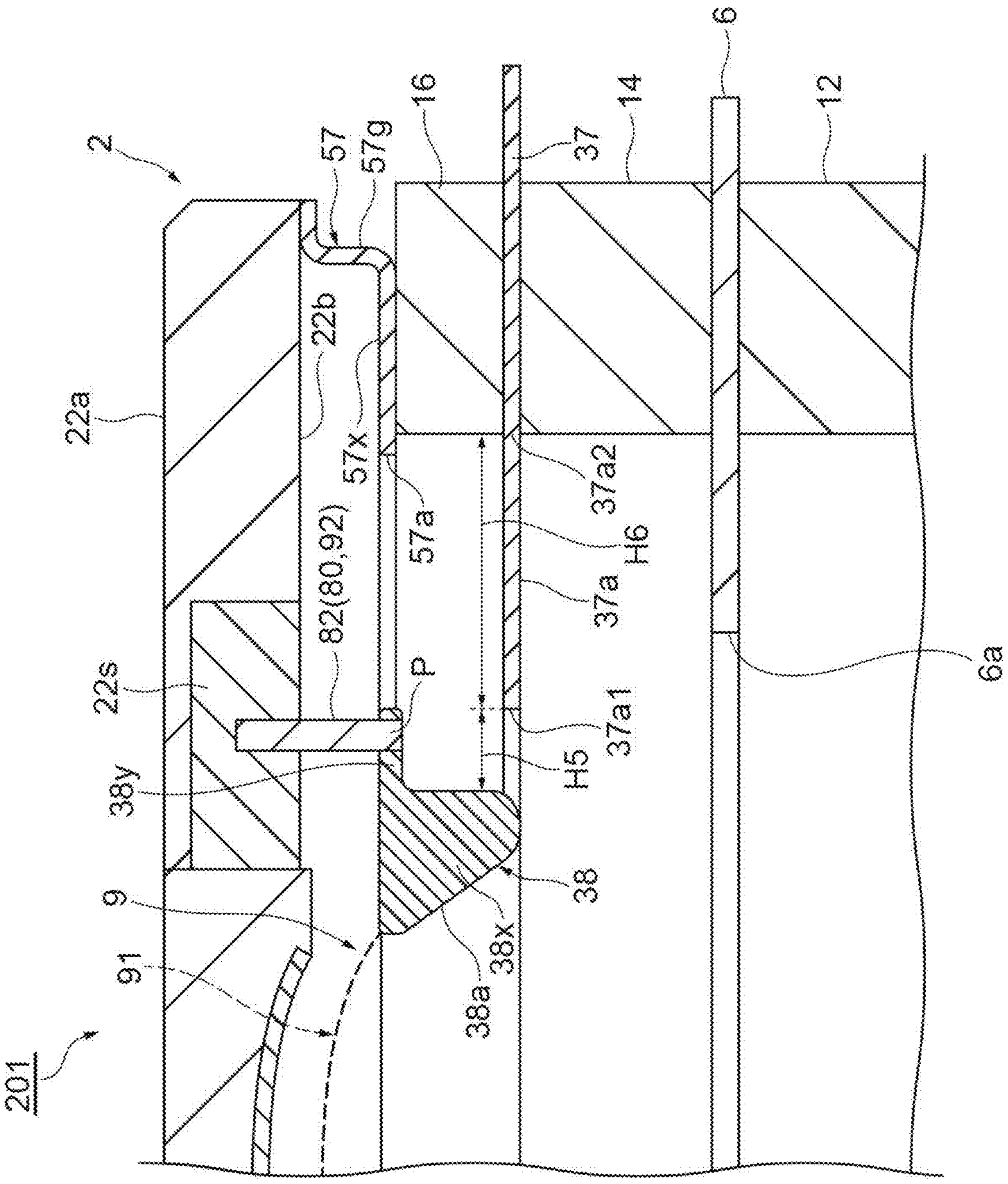
FIG. 7 is a cross-sectional view showing an enlarged part of the inside of an electron tube according to a modified example.

In the present embodiment, instead of the electric field concentration relaxation electrode 27, an electrode part 57, a conductive tubular portion 16 and an electric field concentration relaxation electrode 37 may be provided as shown in FIG. 7. The electrode part 57 is electrically connected to the lid portion 22, is an electrode part in direct contact with the lid portion 22 in the present embodiment, and has a passage hole 57$a$ provided in a central portion. The electrode part 57 is a conductive member including an annular plate portion 57$x$ having an annular shape with the axis G as a central axis thereof and having a thickness direction along the direction of the axis G, and a peripheral wall portion 57$g$ that stands upright on an outer peripheral edge of the annular plate portion 57$x$. The conductive tubular portion 16 is a conductive member having a cylindrical shape with the axis G as a central axis thereof.

The electric field concentration relaxation electrode 37 is a plate-like conductive member having an annular shape with the axis G as a central axis thereof and having a thickness direction in the direction of the axis G. The electric field concentration relaxation electrode 37 has an annular plate portion 37$a$ that extends into the housing 2. The annular plate portion 37$a$ is a portion of the electric field concentration relaxation electrode 37 that extends into the housing 2. An end portion 37$a$1 on the inner peripheral side of the annular plate portion 37$a$ of the electric field concentration relaxation electrode 37 is located closer to the electron detection unit 4 than the connection point P between the rod 80 and the second focusing electrode 38 in the direction of the axis G. The end portion 37$a$1 on the inner peripheral side of the annular plate portion 37$a$ of the electric field concentration relaxation electrode 37 extends in the orthogonal direction (the intersecting direction) perpendicular to the direction of the axis G until it reaches a position close to the power supply part 92, particularly, the cylindrical portion 38$x$ of the second focusing electrode 38 in the present embodiment. In other words, in the orthogonal direction (the intersecting direction) perpendicular to the direction of the axis G, a distance H5 between the end portion 37$a$1 on the inner peripheral side of the annular plate portion 37$a$ of the electric field concentration relaxation electrode 37 and the outer wall surface of the cylindrical portion 38$x$ facing it is shorter than a distance H6 between the end portion 37$a$1 on the inner peripheral side of the annular plate portion 37$a$ of the electric field concentration relaxation electrode 37 and an end portion 37$a$2 on the outer peripheral side of the annular plate portion 37$a$ of the electric field concentration relaxation electrode 37. In the present embodiment, the end portion 37$a$1 on the inner peripheral side of the annular plate portion 37$a$ of the electric field concentration relaxation electrode 37 extends until it reaches the hermetic seal 22$s$ in the orthogonal direction (intersecting direction) perpendicular to the direction of the axis G, and extends until reaches the flange portion 38$y$ here. The end portion 37$a$1 on the inner peripheral side of the annular plate portion 37$a$ of the electric field concentration relaxation electrode 37 extends inward in the orthogonal direction with respect to the intermediate electrode part 6. The electric field concentration relaxation electrode 37 constitutes a fourth electric field concentration relaxation electrode.

The electrode part 57, the conductive tubular portion 16, and the electric field concentration relaxation electrode 37 are disposed to be stacked in this order and are electrically connected to each other. The electrode part 57, the conductive tubular portion 16, and the electric field concentration relaxation electrode 37 are airtightly connected between the lid portion 22 and the insulating tubular portion 14 of the housing 2. In such a configuration, the electric field concentration relaxation electrode 37 relaxes the concentration of the electric field inside the housing 2, and the withstand voltage of the electron tube 201 can be increased.

Although the embodiments have been described above, one aspect of the present disclosure is not limited to the above embodiments. In the above embodiment, although the gate electrode 9 is provided integrally with the second focusing electrode 8, the gate electrode 9 may be provided separately from the second focusing electrode 8. In this case, the gate electrode 9 may be electrically connected to the second focusing electrode 8 via a conductive member, or may have a power supply part separately. Although the above embodiment includes the first rod 81 and the second rod 82, only the first rod 81 may be included.

In the above embodiment, although the main body portion 91 of the gate electrode 9 is electrically connected to the rod 80 via the second focusing electrode 8, instead thereof or in addition thereto, the main body portion 91 may be electrically connected to the rod 80 via a separate conductive member.

In the above embodiment, the photocathode 3 has a curved surface, but the shape of the photocathode 3 is not limited to the curved surface, and may have various shapes. For example, the photocathode 3 may be planar. In the above embodiment, the photocathode 3 is a reflective photoelectric conversion unit, but may be a transmissive photoelectric conversion unit.

In the above embodiment, an avalanche photodiode is used as the electron detection unit 4, but the present disclosure is not limited thereto. The electron detection unit may use other semiconductor electron detection element, may have a simple anode, or may have a dynode and an anode.

Various materials and shapes can be applied to each of the configurations in the above embodiments and modified example without being limited to the materials and shapes described above. Each of the configurations in the above embodiment or modified example can be arbitrarily applied to each of the configurations in other embodiments and modified examples. A part of each of the configurations in the above embodiments and modified example can be omitted as appropriate without departing from the gist of one aspect of the present disclosure.

According to the present disclosure, it is possible to provide an electron tube capable of speeding up the operation of the gate electrode.

What is claimed is:

1. An electron tube comprising:

a photoelectric conversion unit configured to emit photoelectrons corresponding to incident light;

an electron detection unit configured to receive the photoelectrons from the photoelectric conversion unit;

a gate electrode disposed between the photoelectric conversion unit and the electron detection unit; and a housing configured to accommodate the photoelectric conversion unit, the electron detection unit, and the gate electrode, wherein the housing has a lid portion to which the photoelectric conversion unit is fixed and which constitutes one end side of the housing, the gate electrode includes a main body portion that controls passage of the photoelectrons by applying a voltage, and a power supply part that supports the main body portion so as to be spaced apart from the photoelectric conversion unit and applies the voltage to the main body portion, and the power supply part is held by the lid portion.

2. The electron tube according to claim 1, further comprising a focusing electrode provided between the photoelectric conversion unit and the electron detection unit so as to face the photoelectric conversion unit and configured to focus the photoelectrons from the photoelectric conversion unit, wherein the gate electrode is electrically connected to the focusing electrode.

3. The electron tube according to claim 2, wherein the gate electrode is provided integrally with the focusing electrode.

4. The electron tube according to claim 1, wherein the power supply part includes a plurality of rods each fixed to the lid portion and having one end portion located in the housing, and a connection portion that connects one end portion of each of the plurality of rods to the main body portion.

5. The electron tube according to claim 4, wherein the plurality of rods includes a first rod that passes through the lid portion and a second rod having the other end portion embedded in the lid portion.

6. The electron tube according to claim 1, further comprising a first electric field concentration relaxation electrode electrically connected to the lid portion so as to have the same potential as that of the photoelectric conversion unit, and configured to relax concentration of an electric field formed inside the housing, wherein a part of the first electric field concentration relaxation electrode is located closer to the electron detection unit than the main body portion in a facing direction in which the photoelectric conversion unit and the electron detection unit face each other.

7. The electron tube according to claim 4, further comprising a second electric field concentration relaxation electrode electrically connected to the lid portion so as to have the same potential as that of the photoelectric conversion unit and configured to relax concentration of an electric field formed inside the housing, wherein an end portion of the second electric field concentration relaxation electrode on an inner side of the housing is located closer to the electron detection unit than the main body portion in a facing direction in which the photoelectric conversion unit and the electron detection unit face each other, and extends to a position close to the power supply part in an intersecting direction that intersects the facing direction.

8. The electron tube according to claim 7, wherein:

the rod is fixed to the lid portion by a hermetic seal portion, and the end portion of the second electric field concentration relaxation electrode on the inner side of the housing extends until it reaches the hermetic seal portion in the intersecting direction.

9. The electron tube according to claim 4, further comprising a third electric field concentration relaxation electrode electrically connected to the lid portion so as to have the same potential as that of the photoelectric conversion unit and configured to relax concentration of an electric field formed inside the housing, wherein an end portion of the third electric field concentration relaxation electrode on an inner side of the housing is located closer to the electron detection unit than a connection point between the rod and the connection portion in the facing direction in which the photoelectric conversion unit and the electron detection unit face each other.

10. The electron tube according to claim 9, wherein one end portion of the third electric field concentration relaxation electrode extends until it reaches the connection portion in an intersecting direction that intersects the facing direction.

11. The electron tube according to claim 4, further comprising a fourth electric field concentration relaxation electrode configured to extend along an intersecting direction that intersects the facing direction in which the photoelectric conversion unit and the electron detection unit face each other, having one end portion located inside the housing and the other end portion located outside the housing, and configured to relax concentration of an electric field formed inside the housing, wherein one end portion of the fourth electric field concentration relaxation electrode is located closer to the electron detection unit than a connection point between the rod and the connection portion in the facing direction, and extends to a position close to the power supply part in the intersecting direction.

12. The electron tube according to claim 11, wherein one end portion of the fourth electric field concentration relaxation electrode extends until it reaches the connection portion in the intersecting direction.

* * * * *